United States Patent
Klausing et al.

(10) Patent No.: US 6,515,613 B2
(45) Date of Patent: Feb. 4, 2003

(54) ROSAR METHOD FOR LANDING HELICOPTERS UNDER ADVERSE WEATHER CONDITIONS AND FOR RECOGNIZING AND DETECTING CONCEALED TARGETS

(75) Inventors: Helmut Klausing, Hochstadt (DE); Horst Kaltschmidt, Neubiberg (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 10/050,602

(22) Filed: Jan. 18, 2002

(65) Prior Publication Data

US 2002/0145555 A1 Oct. 10, 2002

(30) Foreign Application Priority Data

Jan. 18, 2001 (DE) .......................... 101 01 992

(51) Int. Cl.$^7$ .............................................. G01S 13/90
(52) U.S. Cl. ........................ 342/25; 342/189; 342/26
(58) Field of Search ................ 342/25, 22, 26, 342/29, 33, 189, 195

(56) References Cited

U.S. PATENT DOCUMENTS

| | | | | |
|---|---|---|---|---|
| 4,737,788 A | | 4/1988 | Kennedy | 342/29 |
| 5,465,142 A | * | 11/1995 | Krumes et al. | 356/5.01 |
| 5,900,833 A | * | 5/1999 | Sunlin et al. | 342/22 |
| 6,255,980 B1 | * | 7/2002 | Matthews | 342/22 |

FOREIGN PATENT DOCUMENTS

| | | |
|---|---|---|
| DE | 3922086 | 10/1990 |
| DE | 4323511 | 1/1995 |
| DE | 19521624 | 12/1995 |

OTHER PUBLICATIONS

"SIREV—Sector Imaging Radar for Enhanced Vision", Krieger, G.; Mittermayer, J.; Wendler, M.; Witte, F.; Moreira, A., Image an Signal Processing and Analysis, 2001. ISPA 2001. Proceedings of the 2nd International Symposium on, 2001, pp.: 377–382.*

"Observations of forests using a helicopter–borne nadir–looking radar: a new method for morphometric purposes", Bourdeau, M Dechambre, M., Geoscience and Remote Sensing, IEEE Transactions on , vol.: 37 Issue: 4, Jul. 1999, pp.: 2080–2091.*

"High resolution SAR/ISAR imaging from a helicopter platform", Barclay, M.W.; Williams, N.K., Radar 97 (Conf. Publ. No. 449) 1997, pp.: 109–113.*

"Feasibility of a synthetic aperture radar with rotating antennas (ROSAR)", Klausing, H.; Keydel, W., Radar Conference, 1990. Record of the IEEE 1990 International, 1990, pp.: 51–56.*

* cited by examiner

Primary Examiner—John B. Sotomayor
(74) Attorney, Agent, or Firm—Crowell & Moring LLP

(57) ABSTRACT

In a method for operating a rotating synthetic aperture radar system that works with pulse frequency or in FM-CW operation in order to detect, penetrate and evaluate objects that are located vertically below the helicopter carrying the ROSAR device, pixels are determined using their own specific doppler histories.

10 Claims, 3 Drawing Sheets

ROSAR METHOD FOR LANDING HELICOPTERS UNDER ADVERSE WEATHER CONDITIONS AND FOR RECOGNIZING AND DETECTING CONCEALED TARGETS

BACKGROUND OF THE INVENTION

This application claims the priority of German patent application 101 01 992.0, filed Jan. 18, 2001, the disclosure (s) of which is (are) expressly incorporated by reference herein.

The invention relates to a ROSAR (rotating synthetic apparatus radar method for landing helicopters under adverse weather conditions, and for recognizing and detecting concealed targets.

A ROSAR device, described in German patent documents DE 39 22 086 and DE 43 23 511 can be used in near real time on-line operation and is able to perform, in addition to mapping, obstacle warning, mine detection, landing assistance, reconnoitering and tracking as well as missile guidance functions. The ROSAR device is used in pulse frequency or FM-CW operation and in the cm- or in the mm-wavelength range.

With the current state of the art, due to the lack of running time-dependent range data, the creation of a so-called "radar with vertical view" for SAR and ROSAR systems can only be realized using a costly phased-array system. In particular, the penetration of trees, shrubs, and other covered-up objects, such as flat layers of earth, require large wavelengths; and the desired resolution can be achieved only with very large dimensioned antennas. The latter, however, results in an extreme degradation of the flight performance and considerable expense.

SUMMARY OF THE INVENTION

It is an objective of the present invention to image the area that lies vertically below the helicopter at high resolution and to describe an evaluation procedure that does not rely on a wavelength-dependent range resolution. Another object of the invention is to provide such a procedure in which especially the horizontal resolution is not dependent on the depression angle. Finally, still another object of the invention to eliminate the disadvantages of the current state of the art.

These and other objects and advantages are achieved by the ROSAR process and apparatus according to the invention, in which the resolution cells (hereinafter, "pixels") are characterized solely by their own "doppler histories" (that is, doppler frequency displacement). This is in contrast to a traditional ROSAR system which provides that a pixel is formed with regard to range and azimuth angle or that according to the principle of the real aperture a surface-type and fixedly mounted antenna detects the elevation and azimuth angles.

The invention thus permits the use of an already available ROSAR system, adding only a special software solution in the ROSAR processor. The large distance between the receiving antenna and the point of rotation of the rotor allows for a very high ROSAR resolution, even in connection with large wavelengths that are necessary for penetrating concealed targets, mines and people. The method according to the invention can be used in either a pulse frequency or FM constant wave context, and in the cm or mm wavelength range.

According to the invention, each target (pixel) in the area to be imaged is irradiated with radar waves by the transmitting antenna. A fraction of the transmitted radar wave is reflected by each pixel in the area to be imaged, towards the receiving antenna based on the backscattering cross-section of that pixel. It should be noted in this regard, that the area to be imaged is that area which is located directly below the helicopter. This area is characterized by concentric rings located under the rotational axis of the rotor blade of the helicopter with each ring comprising a plurality of pixels (FIG. 2a). The pixels are characterized in polar coordinates by the indication of angle and range.

It is known from the principles of synthetic aperture radar, that because of the movement of the receiving antenna relative to the pixel on the ground in the area to be imaged, the distance between the receiving antenna and the pixel changes continuously. Thus, the receiving signal shows a doppler frequency displacement compared to the transmitting signal, and, as noted previously, each pixel is characterized by a significant doppler frequency displacement ("doppler history") and can be distinguished from adjacent pixels on the ground in the area to be imaged.

The reference signals of all pixels in the area to be imaged are stored in a reference signal memory, with the storage positions addressed by the angular position of the pixel. Because of the rotational symmetry of the position of the pixels, all pixels of a pixel ring have the same reference signal. In other words each pixel ring is defined by a single reference signal.

In the case of receiving, the area to be imaged is irradiated by radar pulses. The backscattered sum signal of all pixels in the area to be imaged is stored in the current receiving signal memory with the storage positions addressed by the current position of the rotor blade (FIG. 2b). This sum receiving signal is correlated with the reference signals of all pixel rings; that is, it is cross-correlated with the reference signal of each pixel ring. In other words the correlation of the sum receiving signal with the reference signal of all the pixel rings is performed step-by-step, whereby at each step a cross-correlation of the sum receiving signal with the reference signal of a single pixel ring is performed.

It is clear, that the number of cross-correlations to be performed is equal to the number of pixel rings. With performing the cross-correlation function by correlating the sum receiving signal with the reference signal of a pixel ring the degree of brightness of each pixel in the pixel ring is calculated. Thus, the pixels of the pixel ring characterized by its degree of brightness can be displayed on a monitor, i.e., a 2-d image of the area to be imaged.

Other objects, advantages and novel features of the present invention will become apparent from the following detailed description of the invention when considered in conjunction with the accompanying drawings.

DETAILED DESCRIPTION OF THE INVENTION

As is generally known, with the ROSAR system, the coordinates for the "angle" and "range" of an object are established via two separate processes. The "angle" coordinate is obtained by correlating all signals emanating from within a range ring with a point reference signal ($S_{ref}$), and the "range" coordinate is obtained by evaluating the running time of the reflected signals. Accordingly, the range resolution is $$\Delta R = \frac{c}{2B} \quad (1)$$

(c "velocity of light", B "bandwidth of the transmitting signal")

Figure 1:
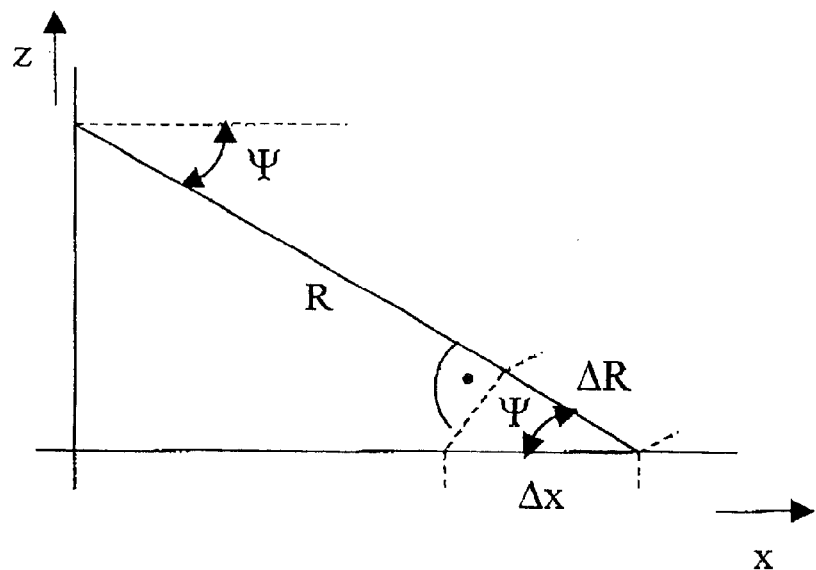
FIG. 1 is a graphic illustration of the relationship between the depression angle ψ, the range resolution ΔR, and the horizontal resolution Δx.

If, however, the antenna looks at the object that is to be resolved at an angle that is below, at the depression angle ψ (FIG. 1), the horizontal resolution (range resolution on the ground (FIG. 1)) is only $$\Delta x = \frac{\Delta R}{\cos\psi} \quad (2)$$

Consequently, the horizontal resolution is much larger for small angles ψ and therefore poorer than the range resolution.

The smallest, and therefore best, achievable range resolution is obtained with $$\Delta R = \frac{\lambda}{2} \quad (3)$$

in which λ="wavelength".

The largest possible, theoretical bandwidth exists with the transmitting frequency $f_s$, hence $B_{max}=f_s$ applies $$\Delta R_{min} = \frac{c}{2B} = \frac{c}{2f_s} = \frac{\lambda f_s}{2f_s} = \frac{\lambda}{2} \quad (4)$$

In practice, calculations are performed using only $B_{max} \leq 0.1\, f_s$.

According to Klausing, the maximum azimuth angle resolution with ROSAR is:

$$\Delta\varphi_{max} = \frac{\lambda}{5L}, \quad (5)$$

in which L is the distance between the ROSAR transmitting/receiving antenna and the point of rotation of the rotor; therefore, it is approximately equal to the radius of the helicopter rotor.

Thus, the pixel A is obtained with:

$$A = \Delta x \Delta y = R\frac{\lambda}{5L}\frac{c}{2B\cos\psi}. \quad (6)$$

The minimum, and therefore most favorable, pixel that can be achieved in theory is:

$$A_{min} = \Delta y_{min}\Delta x_{min} = \frac{R\lambda}{5L_{max}}\frac{\lambda}{2} \quad (7)$$

and in practical application:

$$A_{min,applied} = \frac{R}{L_{max}}\lambda^2 \quad (8)$$

For detecting concealed targets, especially concealed mines, a large wavelength must be selected, due to the strong absorption that occurs with short wavelengths. However, in accordance with the formula for $A_{min}$, the resolution is particularly bad in that instance.

While the lateral resolution Δy can be improved by selecting a large value for L, this is not the case with regard to the vertical view for the range resolution and horizontal resolution; this applies in particular for small depression angles (i.e., for a vertical view). This is the point where the invention comes to bear.

Each coordinate of a pixel (that is, coordinates for the center point of a pixel) in the area to be imaged is characterized by its own coordinate-specific doppler history. It is sufficient to calculate a single reference signal for a circular ring, because in this instance it also applies that:

$$S_{ref\cdot\Delta\alpha}=S_{ref}(\alpha-\Delta\alpha) \quad (9)$$

(wherein α is the rotational angle of the rotor relative to a reference position). That is, the calculation of the result function S (α) is achieved by extending the reference signal, and correlating, step-by-step over the range signal, and a cross-correlation is performed in each case.

Figure 2A:
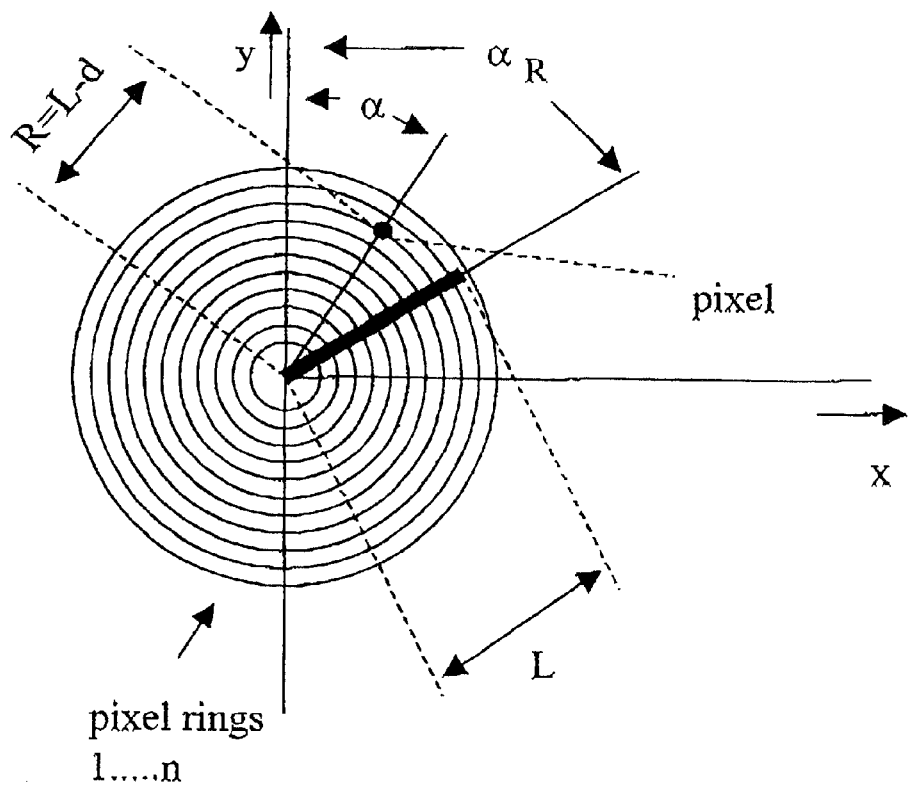
FIG. 2a is a graphic illustration of the xy plane that is to be imaged below a helicopter, showing that each center point of a pixel is characterized in polar coordinates by the indication of angle α and range r=L+d.
Figure 2B:
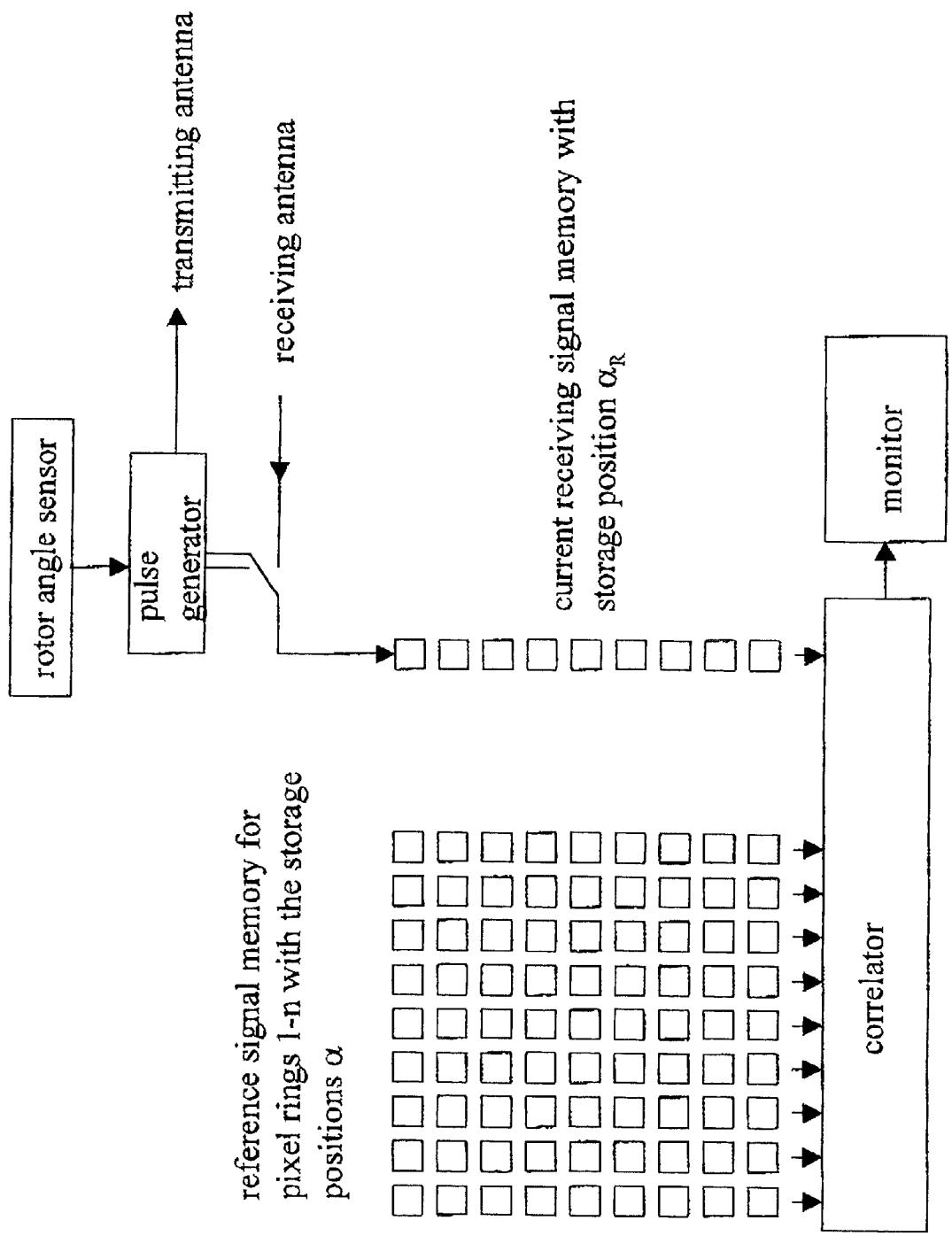
FIG. 2b is a schematic depiction of a ROSAR apparatus according to the invention.
Figure 3A:
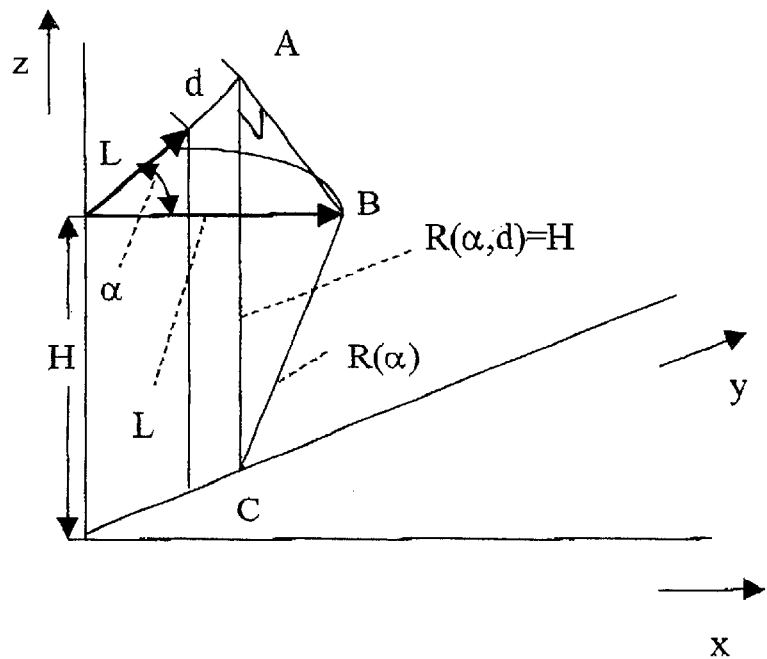
FIG. 3a is a perspective representation of the geometric ratios for the rotor position α.

As an example, in the process according to the invention, the reference function $S_{ref}(L, H, r=L+d, \alpha)$ is subsequently determined for the center points of the pixels (FIG. 2a). In this example, a continuous transmitting signal having the form:

$$S_{transmitting}=S\cdot\sin 2\pi f_s t \quad (10)$$

is broadcast from a fixed-position transmitting antenna. Consequently, each point in the xy plane to be imaged reflects with the frequency $f_s$. The receiving antenna is positioned on a rotating rotor or, in the case to a helicopter (angular velocity $\omega_0$, angular position of the rotor blade $\alpha=\omega_0 t$), at a distance L from the point of rotation of the rotor blade, which is located at a height H above the xy plane to be imaged (FIG. 2 and FIG. 3a).

Preferably, a circular ring is used as a basis directly below the receiving antenna. The thickness of the circular ring is d, and the reference signal, with $\alpha=v\cdot\Delta\alpha$, is in the form of:

$$S_{ref}=\sin 2\pi(f_s+f_D(v\Delta\alpha,d))t \quad (11)$$

in which $f_s$ represents the transmitting frequency, and $f_D$ represents the doppler frequency, and v is a numeric parameter (e.g., $0<v\leq 100$).

The doppler frequency $f_D$ is calculated as follows:

$$f_d = \frac{2V(v\Delta\alpha, d)}{c}\cdot f_s \quad (12)$$

$$\text{with } V = \frac{dR}{dt} \quad (13)$$

wherein R is the distance between the receiving antenna and the top point of the area to be imaged with the coordinates x=0, y=L+d (FIG. 2).

A three-dimensional, perspective representation that easily reveals the geometric ratios is shown in FIG. 3a. Represented is the right triangle ABC whose hypotenuse BC constitutes the distance R(α,d) from the viewed top point C to the current position of the antenna.

Figure 3B:
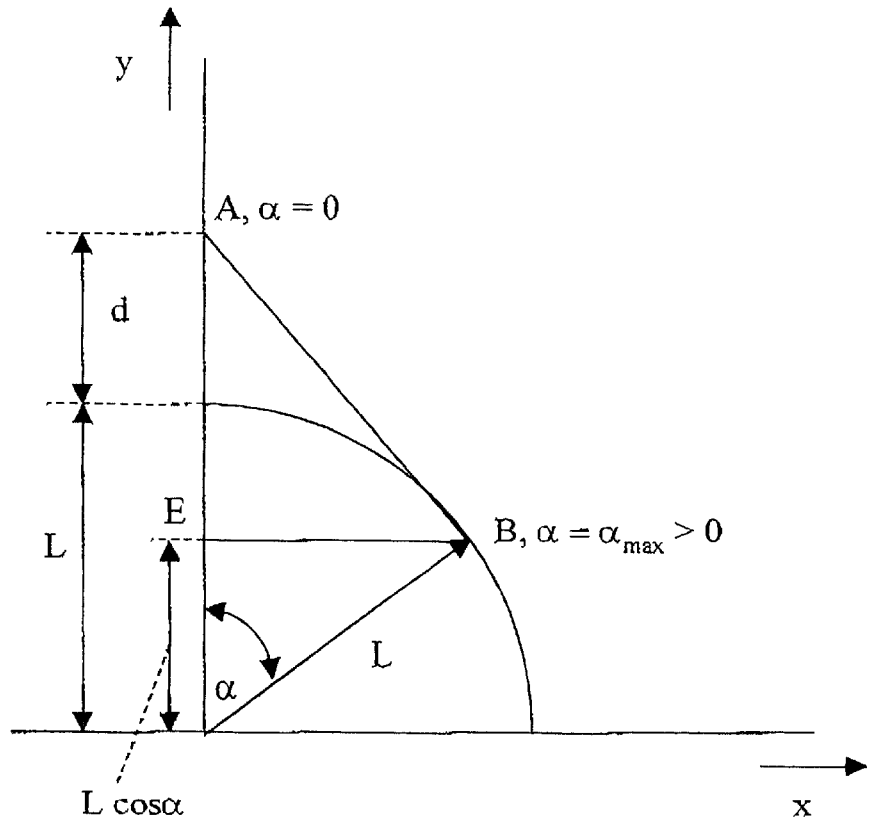
FIG. 3b a diagram containing a representation of the geometric ratios in a top view of the xyz plane.

In the following, the reference signal for a top point with the coordinates x=o, y=L+d, z=0) is calculated (FIG. 3a and FIG. 3b). Due to the symmetry of the problem, it is sufficient to consider only the rotary angle area of α=0 to α=$α_{max}$. (The angle $α_{max}$ indicates the initial angle of the position of the rotor blade for determining the reference signal.) With a large value of the angle $α_{max}$ the reference signal becomes more exact but needs more memory size in the storage system. A sufficient accuracy for determining the reference signal is achieved with an angle $α_{max}=π/2$.

As stated above, the time-related dependence of the speed or its dependence upon the rotary angle α, with which the receiving antenna approaches or moves away from the top point, must be determined. To this end, first the present distance R(α) between the angle-dependent rotor position and the top point C is calculated. If the rotor tip, upon which the antenna is mounted, rotates farther from its starting position α=0 (position A) by the angle α (position B), the distance to top point C changed from its original value R(0)=H to the now valid value R(α) that applies to any angle α. In order to calculate R (α), consider the triangle with the corner points A,B,C and the sides AB, AC, and BC. One can see that the sides AB and AC enclose a right angle. Therefore, it applies:

$$R^2(α)=(AB)^2+(AC)^2 \quad (14)$$

$$\text{with } (AC)=H. \quad (15)$$

The as yet unknown length of the side (AB) is calculated as follows (in accordance with FIG. 3b, a right triangle with the corner points A,B,E):

$$(AB)^2=(d+L(1-\cos α))^2+(L \sin α)^2 \quad (16)$$

Using the equations (16) and (15), we finally obtain from the equation (14)

$$R(α)=\sqrt{(d+L(1-\cos α))^2+(L \sin α)^{2}+H^2} \quad (17)$$

With $$V = \frac{dR(α)}{dt}$$

and α=ω·t, the speed that is critical to the shift in doppler frequency is calculated as follows:

$$V = \frac{ωL(\sin ω · t + \cos ω · t)}{\sqrt{(d+L(1-\cos ω·t))^2+(L\sin ω·t)^2+H^2}} \quad (18)$$

Using the formulas (11) and (12), the desired (point) reference function according to the invention is finally calculated as follows:

$$S_{ref}(α = ω·t, L+d, H) = \quad (19)$$
$$\sin 2πf_s \left(1 + \frac{2ωL(\sin ω·t + \cos ω·t)}{c·\sqrt{d+L(1-\cos ω·t))^2+(L\sin ω·t)^2+H^2}}\right)$$

In summary, as explained above, the area to be imaged is defined by pixels which are characterized in polar coordinates by the indication of angle α and range R. The determination of the reference signal of a pixel and the determination of the cross-correlation of this reference signal with the sum receiving signal can be illustrated by means of an example.

Regarding a pixel with polar coordinates α=0, R=L (L indicating the distance of the receiving antenna to the rotating axis of the rotor blade), according to Equation (19) the reference signal $S_{ref}$ (α=ωt, L, H) of this pixel is calculated for an exemplary value of $α_{max}=π/2$. The calculation in this case is performed for the angle range $-π/2≤α≤π/2$, and the result is stored in the reference signal memory (FIG. 2b) at the address corresponding to the pixel ring with R=L.

The area to be imaged (which is located directly below the helicopter) is irradiated with radar pulses starting at an initial antenna position at $α_R=π/2$ to an end position at $α_R=-π/2$. The sum receiving signal of all pixels in the area to be imaged is stored in the memory at this address which corresponds to the current angular position of the rotor blade. In a correlation device (e.g., a processor), the cross-correlation function $ψ(v·Δα)=\int S_{ref}(α)·S_E(α-v^*Δα)$ is performed with $S_{ref}$ indicating the reference function and $S_E$ indicating the current sum receiving signal. The particular value of the cross-correlation function represents the brightness value for all pixels situated on the pixel ring with R=L at a distance α=v*Δα with e.g., 100≤v≤100 and Δα=π/100. With this information for each pixel ring a 2-d image of the area directly below the helicopter can be generated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a helicopter mounted ROSAR system for detecting objects located in an area to be imaged, vertically below the helicopter, said method comprising:
   providing a transmitting antenna which is located in a fixed position or near the tip of a rotor blade on said helicopter, and which transmits a signal that is one of a pulse frequency and an FM constant wave signal;
   providing a receiving antenna for receiving reflections of said transmitted signal, said receiving antenna being situated remote from and rotating about a center of rotation which is fixed relative to said helicopter; and
   processing received reflections to generate coordinate information defining a range and angular position of said objects; wherein
   angular coordinate information is determined for a plurality of concentric circular range rings situated in the area to be imaged, each range ring comprising a plurality of pixels situated therein;
   a proper coordinate-specific doppler signal is generated as a reference signal of each coordinate of a center point of a pixel in the area to be imaged; and
   only a single said reference signal is determined for each range ring.

2. The method as claimed in claim 1, wherein the reference signal is shifted in a cross-correlation, step-by-step, over the sum receiving signal.

3. The method as claimed in claim 1, wherein the transmitting antenna broadcasts a continuous transmitting signal for the center points of the pixels for determining a reference signal $S_{ref}$.

4. The method as claimed in claim 1, wherein a circular ring has a thickness of d and is positioned directly below the receiving antenna.

5. The method according to claim 3, wherein said reference signal is calculated according to $$S_{ref} = \sin 2\pi f_s \left( 1 + \frac{2\omega L(\sin \omega t + \cos \omega t)}{c\sqrt{d + L(1 - \cos \omega \cdot t)^2 + (L \sin \omega \cdot t)^2 + H^2}} \right)$$

wherein $f_s$ is a transmitting frequency of the transmitting antenna;

$\omega$ is rotational velocity of the receiving antenna

L is the distance of the receiving antenna from a center of rotation;

t is time;

c is the propagation velocity of light;

d is the width of a range ring; and

H is the height of the receiving antenna above the area to be imaged.

6. A helicopter mounted ROSAR system for detecting objects located in an area to be imaged, vertically below the helicopter, said system comprising:

a transmitting antenna located in a fixed position on said helicopter, for transmitting a signal that is one of a pulse frequency and an FM constant wave signal;

a receiving antenna for receiving reflections of said transmitted signal, said receiving antenna being situated remote from and rotating about a center of rotation which is fixed relative to said helicopter; and a data processor encoded with a program for processing received reflections to generate coordinate information defining a range and angular position of said objects; wherein angular coordinate information is determined for a plurality of concentric circular range rings situated in the area to be imaged, each range ring comprising a plurality of pixels situated therein;

a proper coordinate-specific doppler signal is generated as a reference signal of each coordinate of a center point of a pixel in the area to be imaged; and only a single said reference signal is determined for each range ring.

7. The ROSAR system as claimed in claim 6, wherein the reference signal is shifted in a cross-correlation, step-by-step, over the sum receiving signal.

8. The ROSAR system as claimed in claim 6, wherein the transmitting antenna broadcasts a continuous transmitting signal for the center points of the pixels for determining a reference signal $S_{ref}$.

9. The ROSAR system as claimed in claim 6, wherein a circular ring has a thickness of d and is positioned directly below the receiving antenna.

10. The ROSAR system according to claim 8, wherein said reference signal is calculated according to $$S_{ref} = \sin 2\pi f_s \left( 1 + \frac{2\omega L(\sin \omega t + \cos \omega t)}{c\sqrt{d + L(1 - \cos \omega \cdot t)^2 + (L \sin \omega \cdot t)^2 + H^2}} \right)$$

wherein $f_s$ is a transmitting frequency of the transmitting antenna;

$\omega$ is rotational velocity of the receiving antenna

L is the distance of the receiving antenna from a center of rotation;

t is time;

c is the propagation velocity of light;

d is the width of a range ring; and

H is the height of the receiving antenna above the area to be imaged.

* * * * *